(12) United States Patent
Alluri et al.

(10) Patent No.: US 12,482,501 B2
(45) Date of Patent: Nov. 25, 2025

(54) SYSTEM AND METHOD FOR IDENTIFYING SOUNDTRACK FOR A DIGITAL BOOK USING A MOVIE ADAPTATION TECHNIQUE

(71) Applicant: International Institute of Information Technology, Hyderabad, Hyderabad (IN)

(72) Inventors: Vinoo Alluri, Hyderabad (IN); Makarand Tapaswi, Hyderabad (IN); Jaidev Shriram, Calicut (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 133 days.

(21) Appl. No.: 18/525,607

(22) Filed: Nov. 30, 2023

(65) Prior Publication Data
US 2024/0177741 A1    May 30, 2024

(30) Foreign Application Priority Data
Nov. 30, 2022   (IN) .............................. 202241069044

(51) Int. Cl.
G11B 27/10 (2006.01)
G06F 40/35 (2020.01)
(Continued)

(52) U.S. Cl.
CPC ............ *G11B 27/10* (2013.01); *G06V 10/761* (2022.01); *G06V 20/49* (2022.01); *G06F 40/35* (2020.01)

(58) Field of Classification Search
CPC ....... G11B 27/10; G11B 27/031; G11B 27/28; G06V 10/761; G06V 20/49; G06F 40/35
See application file for complete search history.

(56) References Cited

U.S. PATENT DOCUMENTS

| | | | |
|---|---|---|---|
| 8,644,971 B2 * | 2/2014 | Weinstein .......... | H04N 21/8113 700/94 |
| 8,825,490 B1 * | 9/2014 | Weinstein .......... | H04N 21/8113 704/270 |

(Continued)

OTHER PUBLICATIONS

M. Tapaswi, M. Bäuml and R. Stiefelhagen, "Book2Movie: Aligning video scenes with book chapters," 2015 IEEE Conference on Computer Vision and Pattern Recognition (CVPR), Boston, MA, USA, 2015, pp. 1827-1835, doi: 10.1109/CVPR.2015.7298792.*

(Continued)

*Primary Examiner* — Asher D Kells

(57) ABSTRACT

A method for identifying a soundtrack for a digital book by automatically aligning the digital book and the soundtrack with a movie using a movie adaptation technique is provided. The method includes (i) receiving media content through a user device that includes the digital book, the soundtrack, and the movie, (ii) segmenting (a) the chapters of the digital book into paragraph segments, (b) the movie into scene boundaries, and (c) tracks of the soundtrack into cohesive track segments, (iii) aligning the scene boundaries with the paragraph segments to generate aligned paragraph segments, (iv) aligning a background soundtracks of the movie with the cohesive track segments of the soundtrack using a majority key and a minority key of the cohesive track segments and the background soundtracks to generate aligned cohesive track segments and (v) aligning the aligned paragraph segments with the aligned cohesive track segments.

20 Claims, 6 Drawing Sheets

(51) Int. Cl.
    *G06V 10/74*          (2022.01)
    *G06V 20/40*          (2022.01)

(56) References Cited

U.S. PATENT DOCUMENTS

| | | | | |
|---|---|---|---|---|
| 10,387,570 | B2* | 8/2019 | VanBlon | G06F 40/30 |
| 2010/0050064 | A1* | 2/2010 | Liu | G06F 40/279 |
| | | | | 715/202 |
| 2011/0153047 | A1* | 6/2011 | Cameron | G06F 16/951 |
| | | | | 700/94 |
| 2011/0195388 | A1* | 8/2011 | Henshall | G09B 5/062 |
| | | | | 434/317 |
| 2013/0073675 | A1* | 3/2013 | Hwang | G06F 16/94 |
| | | | | 709/217 |
| 2013/0074133 | A1* | 3/2013 | Hwang | G06F 16/48 |
| | | | | 725/93 |
| 2014/0040715 | A1* | 2/2014 | Younge | G06F 40/166 |
| | | | | 715/203 |
| 2018/0032305 | A1* | 2/2018 | Cameron | G06F 40/30 |

OTHER PUBLICATIONS

Y. Zhu et al., "Aligning Books and Movies: Towards Story-Like Visual Explanations by Watching Movies and Reading Books," 2015 IEEE International Conference on Computer Vision (ICCV), Santiago, Chile, 2015, pp. 19-27, doi: 10.1109/ICCV.2015.11.*

* cited by examiner

RECEIVING ONE OR MORE MEDIA CONTENTS THROUGH A USER DEVICE ASSOCIATED WITH A USER, THE ONE OR MORE MEDIA CONTENTS INCLUDE ONE OR MORE DIGITAL BOOKS, ONE OR MORE MOVIES, AND ONE OR MORE SOUNDTRACKS, THE ONE OR MORE DIGITAL BOOKS INCLUDE ONE OR MORE CHAPTERS, THE ONE OR MORE DIGITAL SOUNDTRACKS INCLUDE ONE OR MORE TRACKS, THE ONE OR MORE MOVIES INCLUDE ONE OR MORE BACKGROUND SOUNDTRACKS, THE ONE OR MORE BACKGROUND SOUNDTRACKS ARE EXTRACTED BY FILTERING NOISE AND DIALOGUES IN THE ONE OR MORE MOVIES USING AN AUDIO RECOGNITION TOOL

402

SEGMENTING (I) THE ONE OR MORE CHAPTERS OF THE ONE OR MORE DIGITAL BOOKS INTO ONE OR MORE PARAGRAPH SEGMENTS, (II) THE ONE OR MORE MOVIES INTO ONE OR MORE SCENE BOUNDARIES, AND (III) THE ONE OR MORE TRACKS OF THE ONE OR MORE SOUNDTRACKS INTO ONE OR MORE COHESIVE TRACK SEGMENTS

404

ALIGNING THE ONE OR MORE SCENE BOUNDARIES OF THE ONE OR MORE MOVIES WITH (I) THE ONE OR MORE CHAPTERS USING A CHAPTER-SCENE COARSE ALIGNMENT METHOD AND (II) THE ONE OR MORE PARAGRAPH SEGMENTS OF THE ONE OR MORE DIGITAL BOOKS USING A PARAGRAPH-SCENE REFINEMENT METHOD TO GENERATE ONE OR MORE ALIGNED PARAGRAPH SEGMENTS THAT ARE MATCHED WITH THE ONE OR MORE SCENE BOUNDARIES, THE ONE OR MORE ALIGNED PARAGRAPH SEGMENTS ARE ALIGNED WITH THE ONE OR MORE SCENE BOUNDARIES BASED ON ONE OR MORE ALIGNED CHAPTERS THAT ARE MATCHED WITH THE ONE OR MORE SCENE BOUNDARIES

406

ALIGNING THE ONE OR MORE BACKGROUND SOUNDTRACKS OF THE ONE OR MORE ALIGNED SCENE BOUNDARIES WITH THE ONE OR MORE COHESIVE TRACK SEGMENTS OF THE ONE OR MORE SOUNDTRACKS USING A MAJORITY KEY AND A MINORITY KEY OF THE ONE OR MORE COHESIVE TRACK SEGMENTS AND THE ONE OR MORE BACKGROUND SOUNDTRACKS TO GENERATE ONE OR MORE ALIGNED COHESIVE TRACK SEGMENTS THAT ARE MATCHED WITH THE ONE OR MORE BACKGROUND SOUNDTRACKS

408

ALIGNING THE ONE OR MORE ALIGNED PARAGRAPH SEGMENTS WITH THE ONE OR MORE ALIGNED COHESIVE TRACK SEGMENTS, THEREBY RELEVANT COHESIVE TRACK SEGMENTS FROM THE AT LEAST ONE SOUNDTRACK ARE PLAYED TO THE ONE OR MORE PARAGRAPH SEGMENTS THROUGHOUT THE READING DURATION OF THE AT LEAST ONE DIGITAL BOOK.

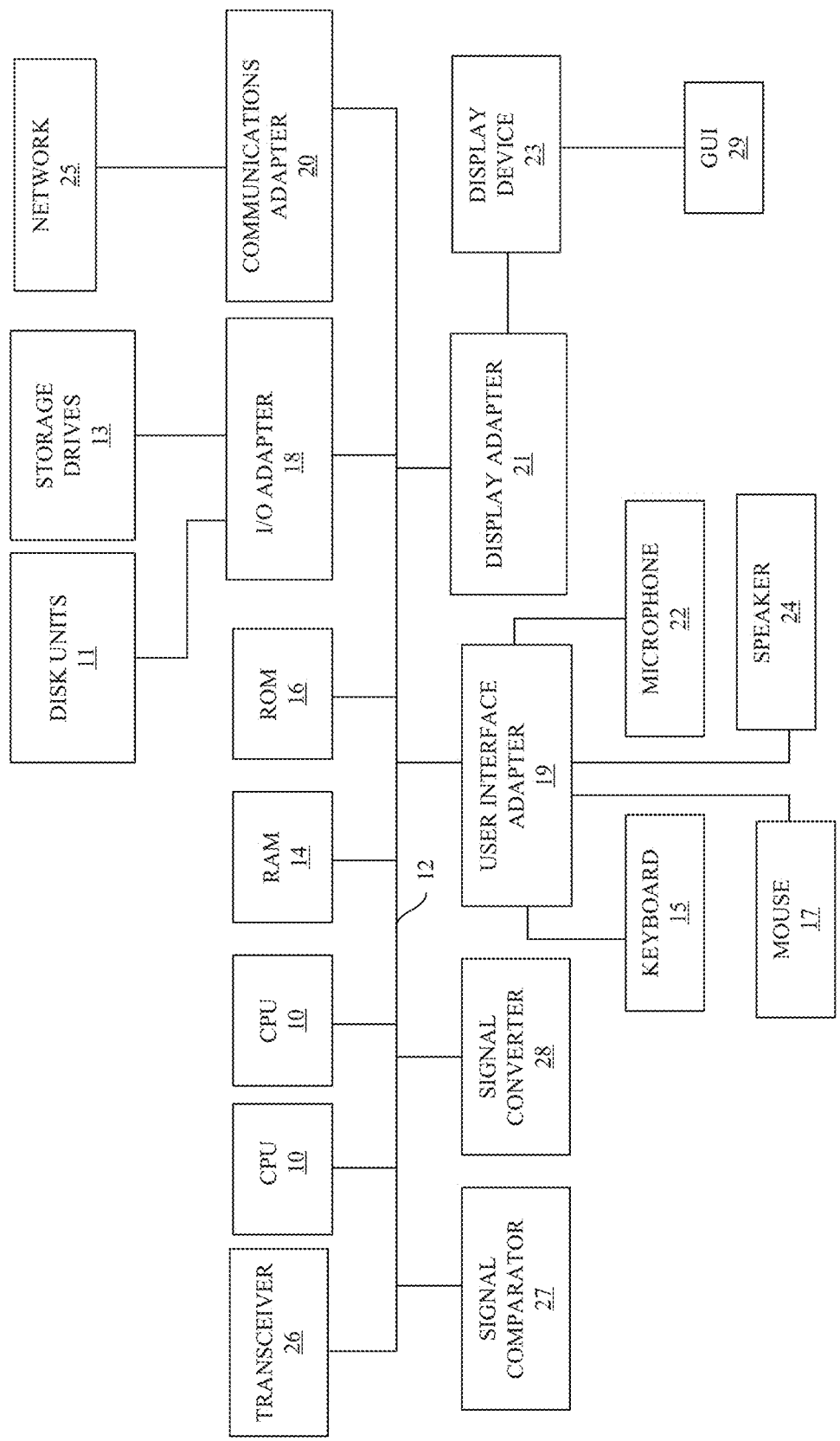

SYSTEM AND METHOD FOR IDENTIFYING SOUNDTRACK FOR A DIGITAL BOOK USING A MOVIE ADAPTATION TECHNIQUE

CROSS-REFERENCE TO RELATED APPLICATIONS

This patent application claims priority to pending Indian provisional patent application no. 202241069044 filed on Nov. 30, 2022, the complete disclosures of which, in their entirety, are hereby incorporated by reference

BACKGROUND

Technical Field

The embodiments herein generally relate to a movie adaptation technique, and more specifically to a method and a system for identifying a soundtrack for a digital book by automatically aligning the digital book and the soundtrack with a movie using a movie adaptation technique.

Description of the Related Art

Reading is an immersive experience that transports readers while taking them on an emotional journey. Listening to complementary music has the potential to amplify the reading experience, especially when the music is stylistically cohesive and emotionally relevant. The music has an important role to play in multimedia, and therefore, appropriate background music that complements a book can further enhance the reading experience. However, composing, or even compiling a playlist manually for a book is a laborious task.

Conventional system disposes of background music for the environment and emotional attributes of a text semantics in a reading page by extracting keywords from the reading page. However, approximate synonyms for the extracted keywords or highly correlated scope of the extracted keywords are used to select background music only for the reading page.

In the existing system, audio cues are associated with different points in the text of a reading page, and the audio cues are dynamically played back in synchronization with a visual display of an electronic book based on an interaction of a user with the electronic book. Moreover, dynamic playback involves editing and playing the audio cue so that it has a duration based on the expected duration of a portion of the electronic book in which the audio cue is synchronized. However, the existing system determines next audio cue should start when the audio cue starts playing in the existing system. Yet, the current audio cue is played for a predicted duration and a transition to the next audio cue when the next audio cue is initiated at an appropriate time.

In the other existing system, matching a genre tag of music based on a genre tag of book when a user is reading is the book. The existing system divides clusters of multiple literary works into multiple literary categories to identify literary category to which the literary work belongs and calculate a correlation value between the literary category and feature vector of the music. However, the music is played based on the genre of the book.

In the existing system, a topic extraction method followed by sentiment analysis or density estimation of emotion-related words is used to generate melodies. On the other hand, in text-to-audio retrieval-based approaches, text mining for a semantic concept is used to retrieve ambient music (sometimes with pitch correction). Despite of, the text-to-audio retrieval only is adapted for tag-based music or characterizes documents and music as a distribution of emotions.

The existing system includes a joint emotion-driven embedding space for story sentences and music enabling cross-modal retrieval. However, understanding emotions conveyed in a book depends on a larger narrative requiring a context of more than a few sentences.

An existing multi-modal music recommendation system uses cues such as user location, time, and environmental information to play music in day-to-day life or even traffic conditions for music in cars and the PICASSO application using a ranking model. The ranking model is trained on pairs of matching music and movie clips (images and subtitles) that are used to provide music recommendations for image slideshows or audiobooks. However, the existing multi-modal music recommendation systems is based on music recommendations for image slideshows or audiobooks.

Therefore, there arises a need to address the aforementioned technical drawbacks in existing technologies for a method and a system for identifying a soundtrack for a digital book by automatically aligning the digital book and the soundtrack with a movie using a movie adaptation technique.

SUMMARY

In view of the foregoing, an embodiment herein provides a processor-implemented method for identifying at least one soundtrack for at least one digital book by automatically aligning the one or more digital books and the at least one soundtrack with at least one movie using a movie adaptation technique, to generate a soundtrack to be played throughout a reading duration of the at least one digital book. The method includes receiving one or more media contents through a user device associated with a user. The one or more media contents includes the at least one digital books, the at least one movie, and the at least one soundtrack. The at least one digital book includes one or more chapters. The at least one soundtrack includes one or more tracks. The at least one movie includes one or more background soundtracks. The one or more background soundtracks are extracted by filtering noise and dialogues in the at least one movie using an audio recognition tool. The method includes segmenting (i) the one or more chapters of the at least one digital book into one or more paragraph segments, (ii) the at least one movie into one or more scene boundaries, and (iii) the one or more tracks of the at least one soundtrack into one or more cohesive track segments. The method includes aligning the one or more scene boundaries of the at least one movie with (i) the one or more chapters using a chapter-scene coarse alignment method and (ii) the one or more paragraph segments of the at least one digital book using a paragraph-scene refinement method to generate one or more aligned paragraph segments that are matched with the one or more scene boundaries. The one or more aligned paragraph segments are aligned with the plurality of scene boundaries based on one or more aligned chapters that are matched with the one or more scene boundaries. The method includes aligning the one or more background soundtracks of the one or more aligned scene boundaries with the one or more cohesive track segments of the at least one soundtrack using a majority key and a minority key of the one or more cohesive track segments and the one or more background soundtracks to generate one or more aligned cohesive track segments that are matched with the one or more background soundtracks. The method includes aligning the one or more aligned paragraph segments with the one or more aligned cohesive track segments, thereby relevant cohesive track segments from the at least one soundtrack are played to the one or more paragraph segments throughout the reading duration of the at least one digital book.

In some embodiments, the method includes segmenting the one or more chapters into the one or more paragraph segments based on narrative-relevant factors of the at least one digital book using a hierarchical clustering method. The narrative-relevant factors comprise at least one of a theme, a location, an activity composition, a character constellation, or time. The hierarchical clustering method groups paragraphs in the one or more chapters based on a proximity of the paragraphs to each other in each chapter. The proximity of the paragraphs is identified based on a narrative shift of each paragraph that is identified based on a meaning of sentences in each chapter using a pre-trained language model. The narrative shift is a significant change in the narrative-relevant factors of the at least one digital book that affects a course of a narrative.

In some embodiments, the method includes segmenting the at least one movie into the one or more scene boundaries by (i) dividing the at least one movie into one or more shots which are consecutive video frames, and (ii) grouping shorts as each scene boundary from the one or more shots based on a similarity between the shorts and the one or more shots. The similarity between the one or more shots is determined using a dynamic programming method.

In some embodiments, the method includes segmenting the one or more tracks of the at least one soundtrack into the one or more cohesive track segments by extracting a key strength in the one or more tracks using a toolbox. The key strength is a change in tonal properties or emotional shifts of the one or more tracks from a major key to a minor key or the minor key to the major key. The toolbox identifies boundaries of the tonal properties of the one or more tracks by computing a similarity matrix between the tonal properties of the one or more tracks at different time intervals. The similarity matrix represents how the tonal properties are similar or dissimilar at different time intervals in the one or more tracks.

In some embodiments, the method includes aligning, using the chapter-scene coarse alignment method, the one or more scene boundaries of the at least one movie with the one or more chapters of the at least one digital book by (i) computing, using a graph-based alignment method, pairwise similarities between each chapter of the at least one digital book and each scene boundary in the at least one movie through character histograms or frequency of characters in each chapter and each scene boundary and matched dialogues between each book chapter and each scene boundary, (ii) encoding the pairwise similarity to represent the similarity score at each connecting node or a point of the one or more chapters with the one or more scene boundaries, and (iii) calculating a shortest path between the one or more scene boundaries and the one or more chapters based on the similarity score.

In some embodiments, the method includes aligning, using the paragraph-scene coarse refinement method, the one or more scene boundaries of the at least one movie with the one or more paragraph segments in the one or more chapters by computing similarities between sentences in the one or more paragraph segments and frames of the one or more scene boundaries using a pre-trained vision-language model.

In some embodiments, the method includes optimizing the alignment between the one or more scene boundaries with the one or more paragraph segments by (i) extracting one or more relevant sentences in the one or more paragraph segments by pruning dialog and mundane sentences from the one or more paragraph segments using a term frequency-inverse document frequency (TF-IDF) score and removing less relevant sentences from the one or more paragraph segments, (ii) encoding the relevant sentences with frames of the one or more scene boundaries based on a high concreteness index of the one or more relevant sentences, (iv) calculating cosine similarity between encoded frames of the one or more scene boundaries with the one or more relevant sentences, and (v) assigning frames to the one or more paragraph segments using a mapping function if the cosine similarity score is higher than a threshold ($\theta$).

In some embodiments, the method includes aligning the one or more aligned paragraph segments with the one or more aligned cohesive track segments by (i) determining a valence label for each cohesive track segment based on the majority key and the minority key of the one or more cohesive track segments, and (ii) aligning the one or more cohesive track segments with the one or more paragraph segments based on an emotional label of each paragraph segment and the valence label of each cohesive track segment.

In some embodiments, the method includes determining the emotional label for each paragraph segment in each chapter by (i) classifying the one or more paragraph segments into three emotional labels using a Bidirectional Encoder Representations from Transformers (BERT) based emotion classifier, and (ii) assigning the emotion label to each paragraph segment in the one or more chapters based a frequency of the emotion label within the one or more paragraph segments.

In some embodiments, the method includes assigning a random soundtrack from the one or more background soundtracks of the at least one movie to each paragraph segment when at least one scene boundary is not aligned with the at least one paragraph segment or when any cohesive track segment is not aligned with at least one paragraph segment that is aligned with the at least one scene boundary.

In one aspect, a system for identifying at least one soundtrack for at least one digital book by automatically aligning the at least one digital book and the at least one soundtrack with at least one movie using a movie adaptation technique, to generate a soundtrack to be played throughout a reading duration of the at least one digital book is provided. The system includes a narrative-aware soundtrack server. The narrative-aware soundtrack server receives one or more media content through a user device associated with a user. The one or more media contents includes the at least one digital book, the at least one movie, and the at least one soundtrack. The at least one digital book includes one or more chapters. The at least one soundtrack includes one or more tracks. The at least one movie includes one or more background soundtracks. The one or more background soundtracks are extracted by filtering noise and dialogues in the at least one movie using an audio recognition tool. The narrative-aware soundtrack server includes a memory that stores a set of instructions and a processor that executes the set of instructions. The processor is configured to segment (i) the one or more chapters of the at least one digital book into one or more paragraph segments, (ii) the at least one movie into one or more scene boundaries, and (iii) the one or more tracks of the at least one soundtrack into one or more cohesive track segments. The processor is configured to align the one or more scene boundaries of the at least one movie with (i) the one or more chapters using a chapter-scene coarse alignment method and (ii) the one or more paragraph segments of the at least one digital book using a paragraph-scene refinement method to generate one or more aligned paragraph segments that are matched with the one or more scene boundaries. The one or more aligned paragraph segments are aligned with the one or more scene boundaries based on one or more aligned chapters that are matched with the one or more scene boundaries. The processor is configured to align the one or more background soundtracks of the one or more aligned scene boundaries with the one or more cohesive track segments of the at least one soundtrack using a majority key and a minority key of the one or more cohesive track segments and the one or more background soundtracks to generate one or more aligned cohesive track segments that are matched with the one or more background soundtracks. The processor is configured to align one or more aligned paragraph segments with the one or more aligned cohesive track segments, thereby relevant cohesive track segments from the at least one soundtrack are played to the one or more paragraph segments throughout the reading duration of the at least one digital book.

In some embodiments, the processor is configured to segment the one or more chapters into the one or more paragraph segments based on narrative-relevant factors of the at least one digital book using a hierarchical clustering method. The narrative-relevant factors comprise at least one of a theme, a location, an activity composition, a character constellation, or time. The hierarchical clustering method groups paragraphs in the one or more chapters based on a proximity of the paragraphs to each other in each chapter. The proximity of the paragraphs is identified based on a narrative shift of each paragraph that is identified based on a meaning of sentences in each chapter using a pre-trained language model. The narrative shift is a significant change in the narrative-relevant factors of the at least one digital book that affects a course of a narrative.

In some embodiments, the processor is configured to segment the at least one movie into the one or more scene boundaries by (i) dividing the at least one movie into one or more shots which are consecutive video frames, and (ii) grouping shorts as each scene boundary from the one or more shots based on a similarity between the one or more shots. The similarity between the shorts and the one or more shots is determined using a dynamic programming method.

In some embodiments, the processor is configured to segment the one or more tracks of the at least one soundtrack into the one or more cohesive track segments by extracting a key strength in the one or more tracks using a toolbox. The key strength is a change in tonal properties or emotional shifts of the one or more tracks from a major key to a minor key or the minor key to the major key. The toolbox identifies boundaries of the tonal properties of the one or more tracks by computing a similarity matrix between the tonal properties of the one or more tracks at different time intervals. The similarity matrix represents how the tonal properties are similar or dissimilar at different time intervals in the one or more tracks.

In some embodiments, the processor is configured to align, using the chapter-scene coarse alignment method, the one or more scene boundaries of the at least one movie with the one or more chapters of the at least one digital book by (i) computing, using a graph-based alignment method, pairwise similarities between each chapter of the at least one digital book and each scene boundary in the at least one movie through character histograms or frequency of characters in each chapter and each scene boundary and matched dialogues between each book chapter and each scene boundary, (ii) encoding the pairwise similarity to represent the similarity score at each connecting node or a point of the one or more chapters with the one or more scene boundaries, and (iii) calculating a shortest path between the one or more scene boundaries and the one or more chapters based on the similarity score.

In some embodiments, the processor is configured to align, using the paragraph-scene coarse refinement method, the one or more scene boundaries of the at least one movie with the one or more paragraph segments in the one or more chapters by computing similarities between sentences in the one or more paragraph segments and frames of the one or more scene boundaries using a pre-trained vision-language model.

In some embodiments, the processor is configured to optimize the alignment between the one or more scene boundaries with the one or more paragraph segments by (i) extracting one or more relevant sentences in the one or more paragraph segments by pruning dialog and mundane sentences from the one or more paragraph segments using a term frequency-inverse document frequency (TF-IDF) score and removing less relevant sentences from the one or more paragraph segments, (ii) encoding the relevant sentences with frames of the one or more scene boundaries based on a high concreteness index of the one or more relevant sentences, (iv) calculating cosine similarity between encoded frames of the one or more scene boundaries with the one or more relevant sentences, and (v) assigning frames to the one or more paragraph segments using a mapping function if the cosine similarity score is higher than a threshold ($\theta$).

In some embodiments, the processor is configured to align the one or more aligned paragraph segments with the one or more aligned cohesive track segments by (i) determining a valence label for each cohesive track segment based on the majority key and the minority key of the one or more cohesive track segments, and (ii) aligning the one or more cohesive track segments with the one or more paragraph segments based on an emotional label of each paragraph segment and the valence label of each cohesive track segment.

In some embodiments, the processor is configured to determine the emotional label for each paragraph segment in each chapter by (i) classifying the one or more paragraph segments into three emotional labels using a Bidirectional Encoder Representations from Transformers (BERT) based emotion classifier, and (ii) assigning the emotion label to each paragraph segment in the one or more chapters based a frequency of the emotion label within the one or more paragraph segments.

In some embodiments, the processor is configured to assign a random soundtrack from the one or more background soundtracks of the at least one movie to each paragraph segment when at least one scene boundary is not aligned with the at least one paragraph segment or when any cohesive track segment is not aligned with at least one paragraph segment that is aligned with the at least one scene boundary.

In another aspect, one or more non-transitory computer-readable storage mediums configured with instructions executable by one or more processors to cause the one or more processors to perform a method of identifying at least one soundtrack for at least one digital book by automatically aligning the at least one digital book and the at least one soundtrack with at least one movie using a movie adaptation technique, to generate a soundtrack throughout a reading duration of the at least one digital book is provided. The method includes receiving one or more media contents through a user device associated with a user. The one or more media contents includes the at least one digital book, the at least one movie, and the at least one soundtrack. The at least one digital book includes one or more chapters. The at least one soundtrack includes one or more tracks. The at least one movie includes one or more background soundtracks. The one or more background soundtracks are extracted by filtering noise and dialogues in the at least one movie using an audio recognition tool. The method includes segmenting (i) the one or more chapters of the at least one digital book into one or more paragraph segments, (ii) the at least one movie into one or more scene boundaries, and (iii) the one or more tracks of the at least one soundtrack into one or more cohesive track segments. The method includes aligning the one or more scene boundaries of the at least one movie with (i) the one or more chapters using a chapter-scene coarse alignment method and (ii) the one or more paragraph segments of the at least one digital book using a paragraph-scene refinement method to generate one or more aligned paragraph segments that are matched with the one or more scene boundaries. The one or more aligned paragraph segments are aligned with the plurality of scene boundaries based on a plurality of aligned chapters that are matched with the one or more scene boundaries. The method includes aligning the one or more background soundtracks of the one or more scenes boundaries with the one or more cohesive track segments of the at least one soundtrack using a majority key and a minority key of the one or more cohesive track segments and the one or more background soundtracks to generate one or more aligned cohesive track segments that are matched with the plurality of background soundtracks. The method includes aligning the one or more aligned paragraph segments with the one or more aligned cohesive track segments, thereby relevant cohesive track segments from the at least one soundtrack are played to the one or more paragraph segments throughout the reading duration of the at least one digital book.

A method and a system for identifying a soundtrack for a digital book by automatically aligning the digital book and the soundtrack with the movie using a movie adaptation technique. The system searches for music that plays in the identified movie scenes with high-precision narrative matches. This means selecting music that not only corresponds to the general mood of the scene but also aligns closely with the narrative content of the book. The system amplifies a reading experience by providing a dense soundtrack to the book's content so that readers can engage with the book while listening to high-quality instrumental music that enhances the mood and atmosphere of a narrative. The system allows the readers to experience a continuous and high-quality instrumental music soundtrack for entire reading duration that enhances immersion and creates a cohesive audio-visual experience throughout the entire reading process as the system identifies scenes in the movie that match parts of the book. This matching process allows for a synchronized connection between specific segments of the book and corresponding scenes in the movie.

The system finds scenes using the movie adaptation technique that match parts of the book and searches for music that plays in that movie scene with high-precision narrative matches. The system allows readers to read books along with the dense soundtrack with books by playing high-quality instrumental music for the entire reading duration with high-quality narrative-specific matches to amplify the reading experience.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a flow diagram that illustrates a method for identifying a soundtrack for a digital book by automatically aligning the digital book and the soundtrack with movie using a movie adaptation technique according to some embodiments herein; and FIG. 5 is a schematic diagram of a computer architecture in accordance with the embodiments herein.

DETAILED DESCRIPTION OF THE DRAWINGS

Figure 1:
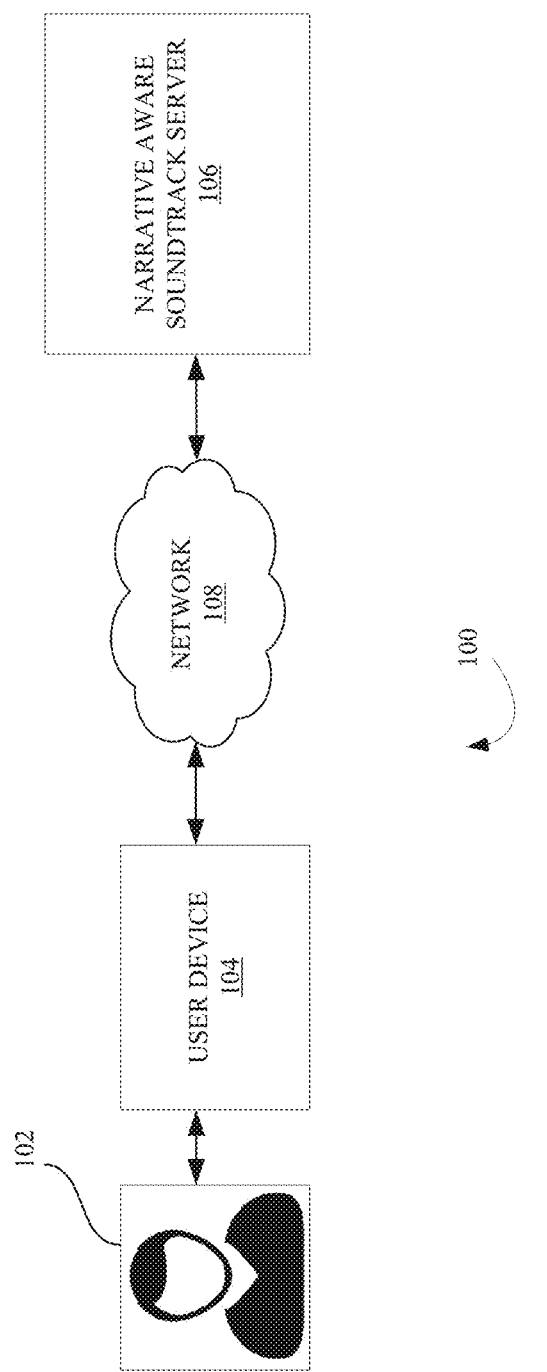
FIG. 1 illustrates a system for identifying a soundtrack for a digital book by automatically aligning the digital book and the soundtrack with movie using a movie adaptation technique according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a method and a system for identifying a soundtrack for a digital book by automatically aligning the digital book and the soundtrack with a movie using a movie adaptation technique, to generate a soundtrack throughout a reading duration of the at least one digital book according to some embodiments herein. Referring now to the drawings, and more particularly to FIGS. 1 through 5, where similar reference characters denote corresponding features consistently throughout the figures, there are shown preferred embodiments.

FIG. 1 illustrates a system 100 for identifying a soundtrack for a digital book by automatically aligning the digital book and the soundtrack with a movie using a movie adaptation technique according to some embodiments herein. The system 100 includes a user device 104 associated with a user 102, and a narrative-aware soundtrack server 106. A list of devices that are capable of hosting narrative-aware soundtrack server 106, without limitation, may include one or more personal computers, laptops, tablet devices, smartphones, mobile communication devices, personal digital assistants, or any other such computing device.

The user device 104, without limitation, may include a mobile phone, a kindle, a PDA (Personal Digital Assistant), a tablet, a music player, a computer, an electronic notebook, or a smartphone. The narrative-aware soundtrack server 106 may communicate with the user device 104 through a network 108 to receive one or more media contents. In some embodiments, the network 108 is a wireless network or a wireless network. In some embodiments, the network 108 is a combination of a wired network and a wireless network. In some embodiments, the network 108 is an Internet.

The one or more media contents may be one or more digital books. The one or more digital books may be represented as B=[B1, . . . , BL]), the one or more soundtracks may be represented as M=[M1, . . . , MP], or the one or more movies may be represented as V=[V1, . . . , VQ]). The one or more digital books may be e-books. The one or more digital books may be in the form of a Portable Document Format (PDF), or word format. The one or more digital books include one or more chapters ($B_i$). The one or more soundtracks are referred to as music. The one or more soundtracks may include one or more tracks ($M_j$). The one or more movies include dialogues and one or more background soundtracks. The one or more movies and the one or more digital books may belong to various genres, such as action, drama, comedy, horror, etc. The one or more background soundtracks are extracted by filtering noise and the dialogues in the one or more movies using an audio recognition tool. The audio recognition tool may be Shazam. The processor includes a memory that stores a set of instructions and a processor. The processor executes the set of instructions and is configured to identify the soundtrack for the digital book. The soundtrack may be a music album. The one or more tracks may be tunes, or soundscapes.

The narrative-aware soundtrack server 106 segments the one or more chapters of the one or more digital books into one or more paragraph segments ($B^p_i$) based on narrative-relevant factors of the one or more digital books using a hierarchical clustering method. The narrative-relevant factors may include theme, location, activity composition, character constellation, or time. The hierarchical clustering method may be temporally weighted hierarchical clustering (TW-FINCH). The TW-FINCH groups paragraphs in the one or more chapters based on a proximity of the paragraphs to each other in each chapter. The proximity of the paragraphs is identified based on a narrative shift of each paragraph. The narrative shift of each paragraph is identified based on meaning of sentences in each chapter using a pre-trained language model $\phi LM(\cdot)$. The pre-trained language model may be Mpnet. The pre-trained language model (i) understands the meaning of the sentences in each chapter, (ii) performs semantic searches for the meaning of the sentences and (iii) cluster the paragraphs in each chapter based on the meaning of sentences in each chapter by $$\{B^p_i\}^{Ki}_{p=1} = \text{TW-FINCH}(\phi LM(B_i)))$$

The narrative shift is a significant change in the narrative-relevant factors of the one or more digital books that affect the course of a narrative. The narrative shifts identify shifts or transitions in the one or more chapters that help in cluster text in each chapter as one or more paragraph segments for a more coherent and understandable division of a story in the one or more digital books. For example, the story may transition from one location to another (i.e., the story is shifting from city-based to rural-based), which can signify a change in the shift of characters circumstances in each chapter.

The narrative-aware soundtrack server 106 segments the one or more movies into one or more scene boundaries (Vq). The one or more scene boundaries are segmented by (i) dividing the one or more movies into one or more shots which are consecutive video frames, and (ii) grouping shorts as each scene boundary from the one or more shots based on a similarity between the shorts and the one or more shots. The similarity between the one or more shots are determined using a dynamic programming method. The dynamic programming method dividing videos of the one or more movies into scenes by considering factors like visuals and audio of the one or more movies.

The narrative-aware soundtrack server 106 segments the one or more tracks of the one or more soundtracks into one or more cohesive track segments. The one or more cohesive track segments are homogeneous emotionally-cohesive track segments. The one or more cohesive track segments are defined as different portions or sections of the one or more soundtracks that are interconnected ensuring smooth and seamless transitions between them. The cohesive track segments are defined as the soundtrack segment that has a continuity between different elements within the soundtrack by creating an overall sense of coherence in the soundtrack. The one or more cohesive track segments are segmented by extracting a key strength in the one or more tracks using a toolbox. The toolbox may be a Music Information Retrieval Toolbox (MIRToolbox). The MIRtoolbox is a Matlab toolbox used to extract various musical features from audio files, for segmentation, and clustering the one or more tracks of the one or more soundtracks. The key strength is a change in tonal properties of the one or more tracks from a major key to a minor key or the minor key to the major key. The toolbox may provide a probability for each possible key strength in a 24-dimensional vector. For example, 12 major keys and 12 minor keys are the key strength. The key strength is attributes that capture the tonal properties of the one or more tracks. The key strength indicates emotional shifts in the one or more tracks. The tonal properties may be the emotional shifts. For example, the emotional shifts from a major mode to a minor mode indicate the shift from a positive valence label to a negative valence label in the one or more tracks. The positive valence represents positive emotions (e.g., joy). The negative valence represents negative emotions (e.g., sadness, anger). The toolbox extracts the key strength from the one or more tracks. For example, the one or more tracks in the one or more soundtracks shift from a major key (happy) to a minor key (sad). The toolbox identifies boundaries of the tonal properties or the emotional shifts of the one or more tracks by computing a similarity matrix between the tonal properties of the one or more tracks at different time intervals. The similarity matrix represents how the tonal properties are similar or dissimilar at different time intervals in the one or more tracks.

The narrative-aware soundtrack server 106 aligns the one or more scene boundaries of the one or more movies with the one or more chapters and the one or more paragraph segments of the one or more digital books using a chapter-scene coarse alignment method and a paragraph-scene refinement method to generate one or more aligned paragraph segments that are matched with the one or more scene boundaries. The one or more aligned paragraph segments are aligned with the one or more scene boundaries based on one or more aligned chapters that are matched with the one or more scene boundaries. The one or more aligned paragraph segments are portions of the text from one or more digital books that have been systematically matched and synchronized with the scene boundaries of the one or more movies.

The one or more aligned chapters are the chapters from the one or more digital books that have been systematically matched and synchronized with the one or more scene boundaries of the one or more movies. By aligning chapters, the narrative structure of the digital books is connected to visual and temporal elements of the one or more movies. The chapter-scene coarse alignment method aligns the one or more scene boundaries of the one or more movies with the one or more chapters of the one or more digital books by (i) computing pairwise similarities between each book chapter of the one or more digital books and each scene boundary in the one or more movies using a graph-based alignment method, (ii) encoding the pairwise similarity to represent the similarity score at each connecting node or a point of the one or more chapters with the one or more scene boundaries, and (iii) calculating a shortest path between the one or more scene boundaries and the one or more chapters based on the similarity score. The graph-based alignment method computes the pairwise similarities by determining character histograms or frequency of characters in each book chapter and each scene boundary. The graph-based alignment method computes the pairwise similarities by matching dialogues between each book chapter and each scene boundary.

The paragraph-scene coarse refinement method aligns the one or more scene boundaries of the one or more movies with the one or more paragraph segments in the one or more chapters by computing similarities between sentences in the one or more paragraph segments and frames of the one or more scene boundaries using a pre-trained vision-language model. The narrative-aware soundtrack server 106 optimizes the alignment between the one or more scene boundaries with the one or more paragraph segments by (i) extracting one or more relevant sentences in the one or more paragraph segments by pruning dialog and mundane sentences from the one or more paragraph segments using a term frequency-inverse document frequency (TF-IDF) score and removing less relevant sentences from the one or more paragraph segments, (ii) encoding the relevant sentences with frames of the one or more scene boundaries based on a high concreteness index of the one or more relevant sentences, (iv) calculating cosine similarity between encoded frames of the one or more scene boundaries with the one or more relevant sentences, and (v) assigning frames to the one or more paragraph segments using a mapping function if the cosine similarity score is higher than a threshold (θ). The alignment between the one or more scene boundaries with the one or more paragraph segments is optimized by, $$A(B^p_i) = \{V_q : \text{CLIP}(B^p_i, V_q) > \theta\}$$

The $A(B^p_i)$ represents the aligned scene boundaries in the movie corresponding to the paragraph segments in the digital book. The $A(B^p_i)$ consists of the one or more paragraph segments that are associated with at least one movie scene. It is denoted as $S=\{Bp:|A(Bp)|\geq 1\}$. (i.e.,) if there is at least one video scene aligned with the digital book segment, it belongs to the $A(B^p_i)$.

The $A(B^p_i)$ consists of the one or more paragraph segments without any associated the at least one movie scene. It is denoted as $S^-=\{Bp:A(Bp)=\emptyset\}$. The $S^-$ contains one or more paragraph segments for which the aligned video scenes (A(Bp)) is empty.

The narrative-aware soundtrack server 106 configures the one or more background soundtracks of the one or more movies with the one or more cohesive track segments of the one or more soundtracks using the majority key and the minority key of the one or more cohesive track segments to obtain one or more aligned cohesive track segments that are matched with the one or more background soundtracks. The one or more aligned cohesive track segments are musical segments or track segments that have been systematically matched and synchronized with the background soundtracks of the one or more movies. The track segments are employed together in terms of musical composition, style, or other relevant musical elements.

The narrative-aware soundtrack server 106 aligns the one or more aligned paragraph segments with the one or more aligned cohesive track segments. The one or more aligned paragraph segments with the one or more aligned cohesive track segments are aligned by aligning the text segments from the digital books with the cohesive track segments. The alignment process matches a narrative flow or an emotional tone of the aligned paragraph segments with suitable musical elements in the cohesive track segments to create a soundtrack. that the soundtrack not only follows the narrative of the books aligned with the movies but also ensures that the music is cohesive and enhances the overall audio visual experience. The one or more aligned paragraph segments with the one or more aligned cohesive track segments are aligned by (i) determining a valence label for each cohesive track segment based on the majority key and the minority key of the one or more cohesive track segments, and (ii) aligning the one or more cohesive track segments with the one or more paragraph segments based on an emotional label of each paragraph segment and the valence label of each cohesive track segment. The emotional label is a tag for each paragraph segment that reflects the emotional tone or sentiment expressed within that specific portion of the text. The emotional tone may include happiness, sadness, anger, or fear. The emotional label is used to capture the emotional nuance or theme of each paragraph segment.

The emotional label for each chapter and for each paragraph segment by (i) classifying the one or more paragraph segments into three emotional labels using a Bidirectional Encoder Representations from Transformers (BERT) based emotion classifier, and (ii) assigning the emotion label to each paragraph segment in the one or more chapters based a frequency of the emotion labels within the one or more paragraph segments. The three emotional labels may be positive label, neutral label, or negative label.

The narrative-aware soundtrack server 106 assigns the emotional label to each paragraph segment in the one or more chapters by, $$Ebook(B^p_i) = \text{mode}(\phi \text{BERT}(B^p_i))$$

In some embodiments, the narrative-aware soundtrack server 106 assigns a random soundtrack from the one or more background soundtracks of the at least one movie to each paragraph segment of the one or more soundtracks when at least one scene boundary is not aligned with the at least one paragraph segment or when any cohesive track segment is not aligned with at least one paragraph segment that is aligned with the at least one scene boundary.

Figure 2:
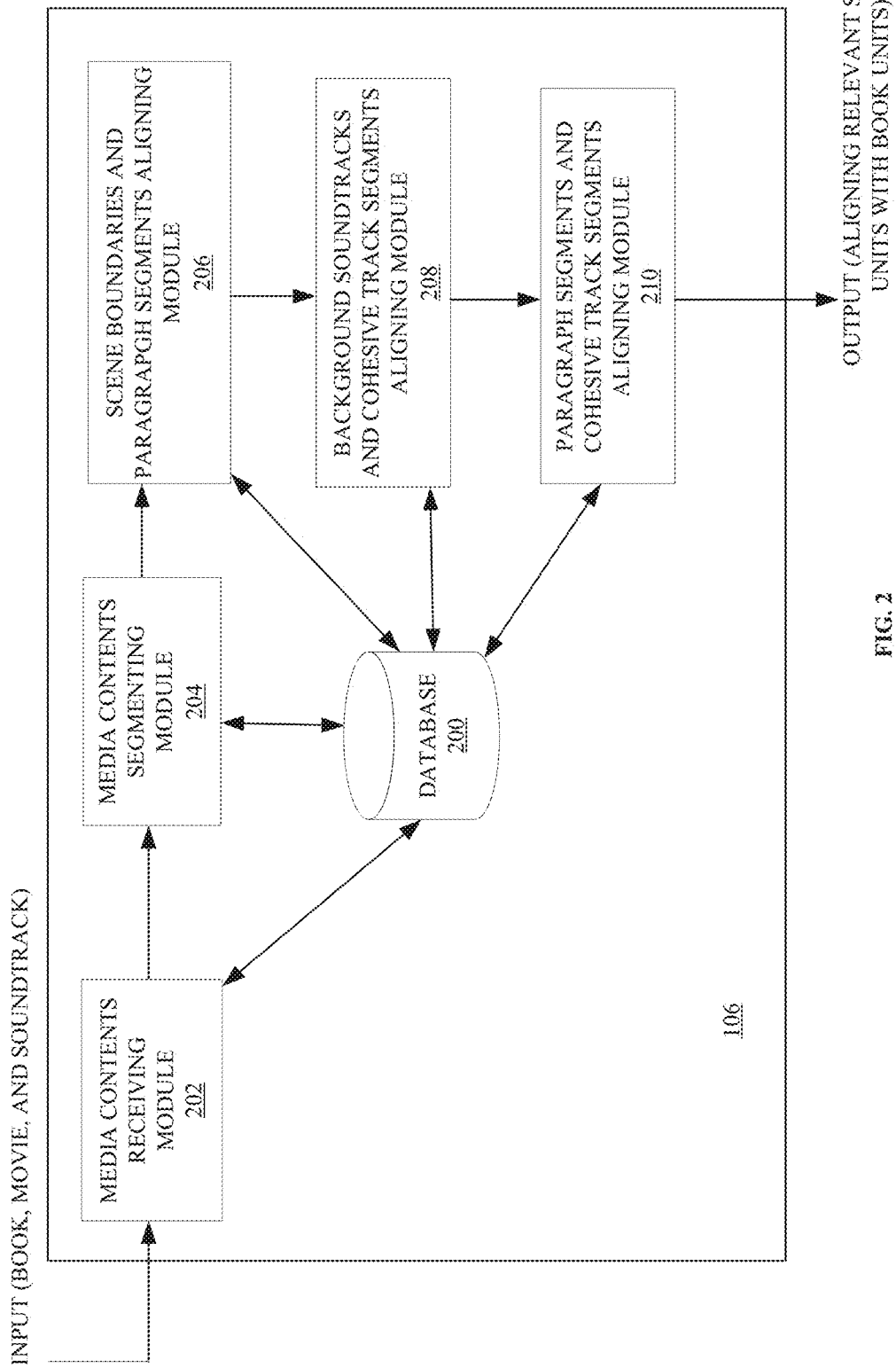
FIG. 2 illustrates a block diagram of a narrative-aware soundtrack server of the system of FIG. 1 according to some embodiments herein.

FIG. 2 illustrates a block diagram of the narrative-aware soundtrack server 106 of the system of FIG. 1 according to some embodiments herein. The narrative-aware soundtrack server 106 includes media contents receiving module 202, media contents segmenting module 204, scene boundaries and paragraph segments aligning module 206, background soundtracks and cohesive track segments aligning module 208 and paragraph segments and cohesive track segments aligning module 210, and a database 200. The media contents receiving module 202 one or more media content through a user device associated with a user. The one or more media contents includes the one or more digital books, the at least one movie, and the one or more soundtracks. The one or more digital books includes one or more chapters. The one or more soundtracks includes one or more tracks. The one or more movies includes one or more background soundtracks. The one or more background soundtracks are extracted by filtering noise and dialogues in the one or more movies using an audio recognition tool. The media contents segmenting module 204 segments (i) the one or more chapters of the one or more digital books into one or more paragraph segments, (ii) the one or more movies into one or more scene boundaries, and (iii) the one or more tracks of the one or more soundtracks into one or more cohesive track segments. The scene boundaries and chapters and paragraph segments aligning module 206 aligns the one or more scene boundaries of the one or more movies with (i) the one or more chapters using a chapter-scene coarse alignment method and (ii) the one or more paragraph segments of the one or more digital books a paragraph-scene refinement method to paragraph segments that are matched with the one or more scene boundaries. The one or more aligned paragraph segments are aligned with the one or more scene boundaries based on one or more aligned chapters that are matched with the one or more scene boundaries.

The background soundtracks and cohesive track segments aligning module 208 aligns the one or more background soundtracks of the one or more aligned scene boundaries with the one or more cohesive track segments of the one or more soundtracks using a majority key and a minority key of the one or more cohesive track segments and the one or more background soundtracks to obtain one or more aligned cohesive track segments that are matched with the one or more background soundtracks. The paragraph segments and cohesive track segments aligning module 210 aligns the one or more aligned paragraph segments with the one or more aligned cohesive track segments. Thereby, relevant cohesive track segments from the one or more soundtracks are played to the one or more paragraph segments throughout the reading duration of the one or more digital books.

Figures 3A, 3B:
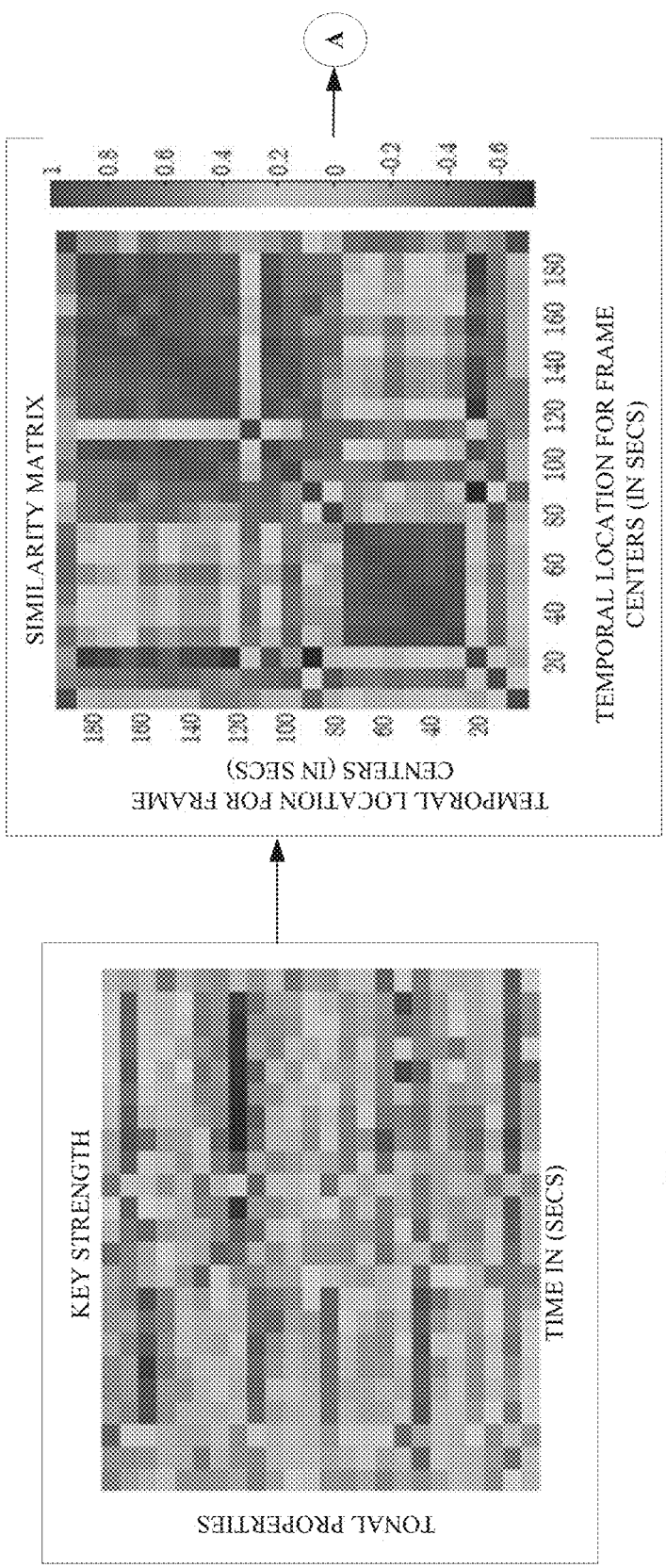
FIG. 3A is an exemplary graphical representation of a key strength extraction according to some embodiments herein.
FIG. 3B is an exemplary graphical representation of a similarity matrix according to some embodiments herein.

FIG. 3A is an exemplary graphical representation of a key strength extraction according to some embodiments herein. The graphical representation depicts a time in seconds on X-axis and tonal properties on Y-axis. The graphical representation depicts that the one or more tracks are divided into 20-second sections with an 85% overlap that allows for capturing larger shifts or transitions in the tonal properties of the one or more tracks while ignoring minor local variations.

FIG. 3B is an exemplary graphical representation of a similarity matrix according to some embodiments herein. The graphical representation depicts a temporal location of frame centers in seconds on X-axis and a temporal location of frame centers in seconds on Y-axis. The graphical representation depicts a self-similarity matrix between the tonal properties of the one or more tracks that are computed based on the key strength at different time intervals. The self-similarity matrix represents how similar or dissimilar the tonal properties of the one or more tracks are at different time intervals.

Figure 3C:
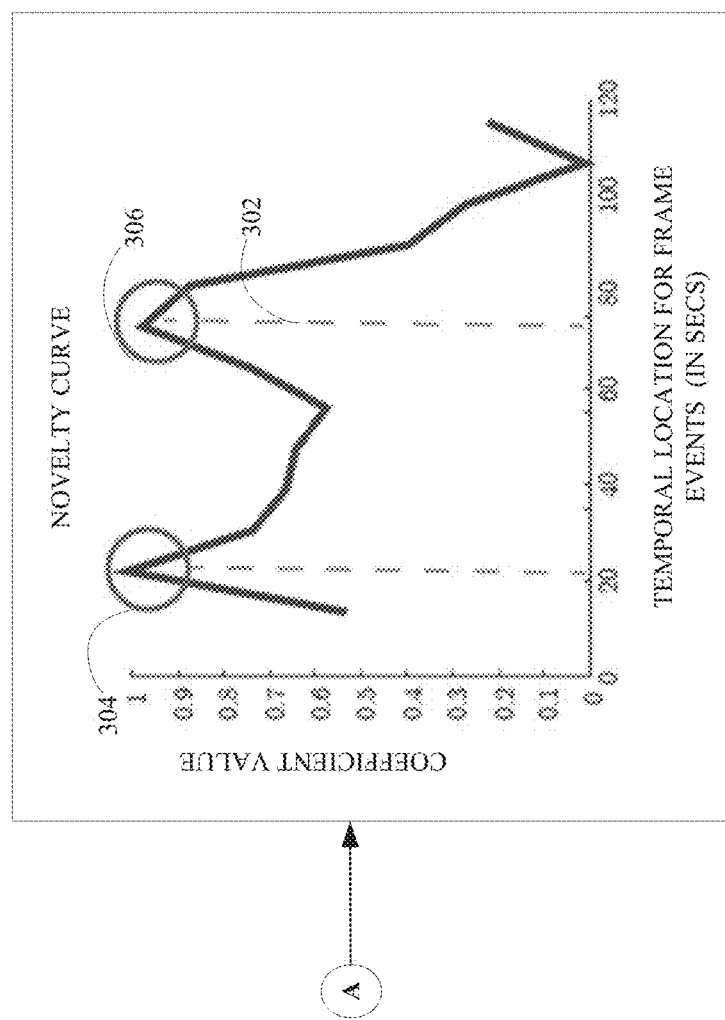
FIG. 3C is an exemplary graphical representation of a novelty curve according to some embodiments herein.

FIG. 3C is an exemplary graphical representation of a novelty curve according to some embodiments herein. The graphical representation depicts a temporal location of events in seconds on the X-axis and a coefficient value on the Y-axis. The graphical representation depicts the novelty curve at 302. The graphical representation depicts changes in the tonal properties of the one or more tracks as peaks at 304 and 306 in the novelty curve 302 of the one or more tracks. The peaks at 304 and 306 indicate seconds in the one or more tracks where the one or more tracks have significant changes in terms of emotion or mood. The peaks 304 and 306 are used as boundaries to divide the one or more tracks into smaller, emotionally cohesive segments (i.e., the one or more cohesive track segments ($L_j$) by $\{M^cj\}^{Lj}_{c=1}$ FIG. 4 is a flow diagram that illustrates a method for identifying soundtrack for a digital book by automatically aligning the digital book and the soundtrack with movie using a movie adaptation technique according to some embodiments herein. At step 402, the method includes receiving one or more media contents through a user device associated with a user. The one or more media contents includes one or more digital books, one or more movies, and one or more soundtracks. The one or more digital books includes one or more chapters. The one or more digital soundtracks includes one or more tracks. The one or more movies includes one or more background soundtracks. The one or more background soundtracks are extracted by filtering noise and dialogues in the one or more movies using an audio recognition tool. At step 404, the method includes segmenting (i) the one or more chapters of the one or more digital books into one or more paragraph segments, (ii) the one or more movies into one or more scene boundaries, and (iii) the one or more tracks of the one or more soundtracks into one or more cohesive track segments. At step 406, the method includes aligning the one or more scene boundaries of the one or more movies with (i) the one or more chapters using a chapter-scene coarse alignment method and (ii) the one or more paragraph segments of the one or more digital books using a paragraph-scene refinement method to generate one or more aligned paragraph segments that are matched with the one or more scene boundaries. The one or more aligned paragraph segments are aligned with the one or more scene boundaries based on one or more aligned chapters that are matched with the one or more scene boundaries. At step 408, the method includes aligning the one or more background soundtracks of the one or more aligned scenes boundaries with the one or more cohesive track segments of the one or more soundtracks using a majority key and a minority key of the one or more cohesive track segments and the one or more background soundtracks to generate one or more aligned cohesive track segments that are matched with the one or more background soundtracks. At step 410, the method includes aligning the one or more aligned paragraph segments with the one or more aligned cohesive track segments, thereby relevant cohesive track segments from the at least one soundtrack are played to the one or more paragraph segments throughout the reading duration of the at least one digital book.

A representative hardware environment for practicing the embodiments herein is depicted in FIG. 5, with reference to FIGS. 1 through 4A and 4B. This schematic drawing illustrates a hardware configuration of narrative-aware soundtrack server 106/computer system/user device 104 in accordance with the embodiments herein. The user device 104 includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for identifying at least one soundtrack for at least one digital book by automatically aligning the at least one digital book and the at least one soundtrack with at least one movie using a movie adaptation technique, to generate a soundtrack to be played throughout a reading duration of the at least one digital book, the method comprising:

receiving a plurality of media contents through a user device associated with a user, wherein the plurality of media contents comprises the at least one digital book, the at least one movie, and the at least one soundtrack, wherein the at least one digital book comprises a plurality of chapters, wherein the at least one soundtrack comprises a plurality of tracks, wherein the at least one movie comprises a plurality of background soundtracks, wherein the plurality of background soundtracks are extracted by filtering noise and dialogues in the at least one movie using an audio recognition tool;

segmenting (i) the plurality of chapters of the at least one digital book into a plurality of paragraph segments, (ii) the at least one movie into a plurality of scene boundaries, and (iii) the plurality of tracks of the at least one soundtrack into a plurality of cohesive track segments;

aligning the plurality of scene boundaries of the at least one movie with (i) the plurality of chapters using a chapter-scene coarse alignment method and (ii) the plurality of paragraph segments of the at least one digital book using a paragraph-scene refinement method to generate a plurality of aligned paragraph segments that are matched with the plurality of scene boundaries, wherein the plurality of aligned paragraph segments are aligned with the plurality of scene boundaries based on a plurality of aligned chapters that are matched with the plurality of scene boundaries;

aligning the plurality of background soundtracks of the plurality of aligned scene boundaries with the plurality of cohesive track segments of the at least one soundtrack using a majority key and a minority key of the plurality of cohesive track segments and the plurality of background soundtracks to generate a plurality of aligned cohesive track segments that are matched with the plurality of background soundtracks; and aligning the plurality of aligned paragraph segments with the plurality of aligned cohesive track segments, thereby relevant cohesive track segments from the at least one soundtrack are played to the plurality of paragraph segments throughout the reading duration of the at least one digital book.

2. The processor-implemented method of claim 1, wherein the method comprises segmenting the plurality of chapters into the plurality of paragraph segments based on narrative-relevant factors of the at least one digital book using a hierarchical clustering method, wherein the narrative-relevant factors comprise at least one of a theme, a location, an activity composition, a character constellation, or time, wherein the hierarchical clustering method groups paragraphs in the plurality of chapters based on a proximity of the paragraphs to each other in each chapter, wherein the proximity of the paragraphs is identified based on a narrative shift of each paragraph that is identified based on a meaning of sentences in each chapter using a pre-trained language model, wherein the narrative shift is a significant change in the narrative-relevant factors of the at least one digital book that affects a course of a narrative.

3. The processor-implemented method of claim 1, wherein the method further comprises segmenting the at least one movie into the plurality of scene boundaries by (i) dividing the at least one movie into a plurality of shots which are consecutive video frames, and (ii) grouping shorts as each scene boundary from the plurality of shots based on a similarity between the shorts and the plurality of shots, wherein the similarity between the plurality of shots is determined using a dynamic programming method.

4. The processor-implemented method of claim 1, wherein the method further comprises segmenting the plurality of tracks of the at least one soundtrack into the plurality of cohesive track segments by extracting a key strength in the plurality of tracks using a toolbox, wherein the key strength is a change in tonal properties or emotional shifts of the plurality of tracks from a major key to a minor key or the minor key to the major key, wherein the toolbox identifies boundaries of the tonal properties of the plurality of tracks by computing a similarity matrix between the tonal properties of the plurality of tracks at different time intervals, wherein the similarity matrix represents how the tonal properties are similar or dissimilar at different time intervals in the plurality of tracks.

5. The processor-implemented method of claim 1, wherein the method further comprises aligning, using the chapter-scene coarse alignment method, the plurality of scene boundaries of the at least one movie with the plurality of chapters of the at least one digital book by (i) computing, using a graph-based alignment method, pairwise similarities between each book chapter of the at least one digital book and each scene boundary in the at least one movie through character histograms or frequency of characters in each chapter and each scene boundary and matched dialogues between each chapter and each scene boundary, (ii) encoding the pairwise similarity to represent the similarity score at each connecting node or a point of the plurality of chapters with the plurality of scene boundaries, and (iii) calculating a shortest path between the plurality of scene boundaries and the plurality of chapters based on the similarity score.

6. The processor-implemented method of claim 1, wherein the method comprises aligning, using the paragraph-scene coarse refinement method, the plurality of scene boundaries of the at least one movie with the plurality of paragraph segments in the plurality of chapters by computing similarities between sentences in the plurality of paragraph segments and frames of the plurality of scene boundaries using a pre-trained vision-language model.

7. The processor-implemented method as claimed in claim 1, wherein the method further comprises optimizing the alignment between the plurality of scene boundaries with the plurality of paragraph segments by (i) extracting a plurality of relevant sentences in the plurality of paragraph segments by pruning dialog and mundane sentences from the plurality of paragraph segments using a term frequency-inverse document frequency (TF-IDF) score and removing less relevant sentences from the plurality of paragraph segments, (ii) encoding the relevant sentences with frames of the plurality of scene boundaries based on a high concreteness index of the plurality of relevant sentences, (iv) calculating cosine similarity between encoded frames of the plurality of scene boundaries with the plurality of relevant sentences, and (v) assigning frames to the plurality of paragraph segments using a mapping function if the cosine similarity score is higher than a threshold ($\theta$).

8. The processor-implemented method of claim 1, wherein the method comprises aligning the plurality of aligned paragraph segments with the plurality of aligned cohesive track segments by (i) determining a valence label for each cohesive track segment based on the majority key and the minority key of the plurality of cohesive track segments, and (ii) aligning the plurality of cohesive track segments with the plurality of paragraph segments based on an emotional label of each paragraph segment and the valence label of each cohesive track segment.

9. The processor-implemented method of claim 8, wherein the method comprises determining the emotional label for each paragraph segment in each chapter by (i) classifying the plurality of paragraph segments into three emotional labels using a Bidirectional Encoder Representations from Transformers (BERT) based emotion classifier, and (ii) assigning the emotion label to each paragraph segment in the plurality of chapters based a frequency of the emotion label within the plurality of paragraph segments.

10. The processor-implemented method of claim 1, wherein the method comprises assigning a random soundtrack from the plurality of background soundtracks of the at least one movie to each paragraph segment when at least one scene boundary is not aligned with the at least one paragraph segment or when any cohesive track segment is not aligned with at least one paragraph segment that is aligned with the at least one scene boundary.

11. A system for identifying at least one soundtrack for at least one digital book by automatically aligning the at least one digital book and the at least one soundtrack with at least one movie using a movie adaptation technique, to generate a soundtrack to be played throughout a reading duration of the at least one digital book, the system comprising:
a narrative-aware soundtrack server receives a plurality of media content through a user device associated with a user, wherein the plurality of media content comprises the at least one digital book, the at least one movie, and the at least one soundtrack, wherein the at least one digital book comprises a plurality of chapters, wherein the at least one soundtrack comprises a plurality of tracks, wherein the at least one movie comprises a plurality of background soundtracks, wherein the plurality of background soundtracks are extracted by filtering noise and dialogues in the at least one movie using an audio recognition tool; wherein the narrative-aware soundtrack server comprises
a memory that stores a set of instructions; and
a processor that executes the set of instructions and is configured to,
segment (i) the plurality of chapters of the at least one digital book into a plurality of paragraph segments, (ii) the at least one movie into a plurality of scene boundaries, and (iii) the plurality of tracks of the at least one soundtrack into a plurality of cohesive track segments,
align the plurality of scene boundaries of the at least one movie with (i) the plurality of chapters using a chapter-scene coarse alignment method and (ii) the plurality of paragraph segments of the at least one digital book using a paragraph-scene refinement method to generate a plurality of aligned paragraph segments that are matched with the plurality of scene boundaries, wherein the plurality of aligned paragraph segments are aligned with the plurality of scene boundaries based on a plurality of aligned chapters that are matched with the plurality of scene boundaries;
align the plurality of background soundtracks of the plurality of aligned scene boundaries with the plurality of cohesive track segments of the at least one soundtrack using the majority key and the minority key of the plurality of cohesive track segments and the plurality of background soundtracks to generate a plurality of aligned cohesive track segments that are matched with the plurality of background soundtracks; and
align the plurality of aligned paragraph segments with the plurality of aligned cohesive track segments, thereby relevant cohesive track segments from the at least one soundtrack are played to the plurality of paragraph segments throughout the reading duration of the at least one digital book.

12. The system of claim 11, wherein the processor is further configured to segment the plurality of chapters into the plurality of paragraph segments based on narrative-relevant factors of the at least one digital book using a hierarchical clustering method, wherein the narrative-relevant factors comprise at least one of a theme, a location, an activity composition, a character constellation, or time, wherein the hierarchical clustering method groups paragraphs in the plurality of chapters based on a proximity of the paragraphs to each other in each chapter, wherein the proximity of the paragraphs is identified based on a narrative shift of each paragraph that is identified based on a meaning of sentences in each chapter using a pre-trained language model, wherein the narrative shift is a significant change in the narrative-relevant factors of the at least one digital book that affects a course of a narrative.

13. The system of claim 11, wherein the processor is further configured to segment the at least one movie into the plurality of scene boundaries by (i) dividing the at least one movie into a plurality of shots which are consecutive video frames, and (ii) grouping shorts as each scene boundary from the plurality of shots based on a similarity between the shorts and the plurality of shots, wherein the similarity between the plurality of shots is determined using a dynamic programming method.

14. The system of claim 11, wherein the processor is further configured to segment the plurality of tracks of the at least one soundtrack into the plurality of cohesive track segments by extracting a key strength in the plurality of tracks using a toolbox, wherein the key strength is a change in tonal properties or emotional shifts of the plurality of tracks from a major key to a minor key or the minor key to the major key, wherein the toolbox identifies boundaries of the tonal properties of the plurality of tracks by computing a similarity matrix between the tonal properties of the plurality of tracks at different time intervals, wherein the similarity matrix represents how the tonal properties are similar or dissimilar at different time intervals in the plurality of tracks.

15. The system of claim 11, wherein the processor is further configured to align, using the chapter-scene coarse alignment method, the plurality of scene boundaries of the at least one movie with the plurality of chapters of the at least one digital book by (i) computing, using a graph-based alignment method, pairwise similarities between each book chapter of the at least one digital book and each scene boundary in the at least one movie through character histograms or frequency of characters in each chapter and each scene boundary and matched dialogues between each chapter and each scene boundary, (ii) encoding the pairwise similarity to represent the similarity score at each connecting node or a point of the plurality of chapters with the plurality of scene boundaries, and (iii) calculating a shortest path between the plurality of scene boundaries and the plurality of chapters based on the similarity score.

16. The system of claim 11, wherein the processor is further configured to align, using the paragraph-scene coarse refinement method, the plurality of scene boundaries of the at least one movie with the plurality of paragraph segments in the plurality of chapters by computing similarities between sentences in the plurality of paragraph segments and frames of the plurality of scene boundaries using a pre-trained vision-language model.

17. The system of claim 11, wherein the processor is further configured to optimize the alignment between the plurality of scene boundaries with the plurality of paragraph segments by (i) extracting a plurality of relevant sentences in the plurality of paragraph segments by pruning dialog and mundane sentences from the plurality of paragraph segments using a term frequency-inverse document frequency (TF-IDF) score and removing less relevant sentences from the plurality of paragraph segments, (ii) encoding the relevant sentences with frames of the plurality of scene boundaries based on a high concreteness index of the plurality of relevant sentences, (iv) calculating cosine similarity between encoded frames of the plurality of scene boundaries with the plurality of relevant sentences, and (v) assigning frames to the plurality of paragraph segments using a mapping function if the cosine similarity score is higher than a threshold ($\theta$).

18. The system of claim 11, wherein the processor is further configured to align the plurality of aligned paragraph segments with the plurality of aligned cohesive track segments by (i) determining a valence label for each cohesive track segment based on the majority key and the minority key of the plurality of cohesive track segments, and (ii) aligning the plurality of cohesive track segments with the plurality of paragraph segments based on an emotional label of each paragraph segment and the valence label of each cohesive track segment.

19. The system of claim 18, wherein the processor is further configured to determine the emotional label for each paragraph segment in each chapter by (i) classifying the plurality of paragraph segments into three emotional labels using a Bidirectional Encoder Representations from Transformers (BERT) based emotion classifier, and (ii) assigning the emotion label to each paragraph segment in the plurality of chapters based a frequency of the emotion label within the plurality of paragraph segments.

20. One or more non-transitory computer-readable storage mediums storing one or sequences of instructions, which when executed by one or more processors, causes a method of identifying at least one soundtrack for at least one digital book by automatically aligning the at least one digital book and the at least one soundtrack with at least one movie using a movie adaptation technique, to generate a soundtrack to be played throughout a reading duration of the at least one digital book, the method comprising:

receiving a plurality of media content through a user device associated with a user, wherein the plurality of media content comprises the at least one digital book, the at least one movie, and the at least one soundtrack, wherein the at least one digital book comprises a plurality of chapters, wherein the at least one soundtrack comprises a plurality of tracks, wherein the at least one movie comprises a plurality of background soundtracks, wherein the plurality of background soundtracks are extracted by filtering noise and dialogues in the at least one movie using an audio recognition tool;

segmenting (i) the plurality of chapters of the at least one digital book into a plurality of paragraph segments, (ii) the at least one movie into a plurality of scene boundaries, and (iii) the plurality of tracks of the at least one soundtrack into a plurality of cohesive track segments;

aligning the plurality of scene boundaries of the at least one movie with (i) the plurality of chapters using a chapter-scene coarse alignment method and (ii) the plurality of paragraph segments of the at least one digital book using a paragraph-scene refinement method to generate a plurality of aligned paragraph segments that are matched with the plurality of scene boundaries, wherein the plurality of aligned paragraph segments are aligned with the plurality of scene boundaries based on a plurality of aligned chapters that are matched with the plurality of scene boundaries;

aligning the plurality of background soundtracks of the plurality of aligned scenes boundaries with the plurality of cohesive track segments of the at least one soundtrack using the majority key and the minority key of the plurality of cohesive track segments and the plurality of background soundtracks to generate a plurality of aligned cohesive track segments that are matched with the plurality of background soundtracks; and aligning the plurality of aligned paragraph segments with the one or more aligned cohesive track segments, thereby relevant cohesive track segments from the at least one soundtrack are played to the plurality of paragraph segments throughout the reading duration of the at least one digital book.

\* \* \* \* \*